(12) United States Patent
Fujii et al.

(10) Patent No.: US 7,198,411 B2
(45) Date of Patent: Apr. 3, 2007

(54) MANUFACTURING METHOD OF OPTICAL COMMUNICATION MODULE, OPTICAL COMMUNICATION MODULE, AND ELECTRONIC APPARATUS

(75) Inventors: Eiichi Fujii, Fujimi-machi (JP); Tomoko Koyama, Hara-mura (JP)

(73) Assignee: Seiko Epson Corporation (JP)

( * ) Notice: Subject to any disclaimer, the term of this patent is extended or adjusted under 35 U.S.C. 154(b) by 248 days.

(21) Appl. No.: 10/797,632

(22) Filed: Mar. 9, 2004

(65) Prior Publication Data
US 2004/0223704 A1 Nov. 11, 2004

(30) Foreign Application Priority Data
Mar. 10, 2003 (JP) .............................. 2003-064136

(51) Int. Cl.
*G02B 6/36* (2006.01)

(52) U.S. Cl. .............................. 385/88; 385/92; 385/49

(58) Field of Classification Search ............ 385/88–94, 385/50, 70–71, 147, 49, 14, 43; 438/455, 438/800; 216/41, 95, 96, 99
See application file for complete search history.

(56) References Cited

U.S. PATENT DOCUMENTS

| | | | | |
|---|---|---|---|---|
| 3,963,308 | A * | 6/1976 | Lebduska | 385/54 |
| 5,545,291 | A | 8/1996 | Smith et al. | |
| 5,904,545 | A * | 5/1999 | Smith et al. | 438/455 |
| 6,832,861 | B2 * | 12/2004 | Kragl | 385/88 |
| 2003/0210870 | A1 * | 11/2003 | Graves | 385/71 |

FOREIGN PATENT DOCUMENTS

| | | |
|---|---|---|
| JP | 50-115837 A | 9/1975 |
| JP | 57-155517 U | 9/1982 |
| JP | 59-94310U | 6/1984 |
| JP | 61-94806 U | 6/1986 |
| JP | 9-506742 T | 6/1997 |
| JP | 11-261111 A | 9/1999 |
| JP | 02000006467 A * | 1/2000 |
| JP | 2000-187137 A | 7/2000 |
| JP | 2002-026440 | 1/2002 |
| JP | 2002-083953 | 3/2002 |
| JP | 2002-100758 | 4/2002 |
| JP | 2002-296463 | 10/2002 |
| JP | 2003-241021 A | 8/2003 |
| WO | WO02/054129 A1 * | 7/2002 |

OTHER PUBLICATIONS

Patent Abstracts of Japan regarding Publication No. 2002-296463 published Oct. 9, 2002.
Patent Abstracts of Japan regarding Publication No. 2002-026440 published Jan. 25, 2002.
Patent Abstracts of Japan regarding Publication No. 2002-083953 published Mar. 22, 2002.
Patent Abstracts of Japan regarding Publication No. 2002-100758 published Apr. 5, 2002.

* cited by examiner

*Primary Examiner*—Hemang Sanghavi
(74) *Attorney, Agent, or Firm*—Harness, Dickey & Pierce, P.L.C.

(57) ABSTRACT

A method is provided to precisely mount an optical device and an optical fiber without manual alignment. A tapered through-hole is provided in a substrate to house the optical device whose optical transmission point substantially coincides with a geometrical center. The optical transmitter having a larger diameter than a diameter of the optical device is further inserted in the tapered through-hole housing the optical device.

9 Claims, 11 Drawing Sheets

F I G. 9
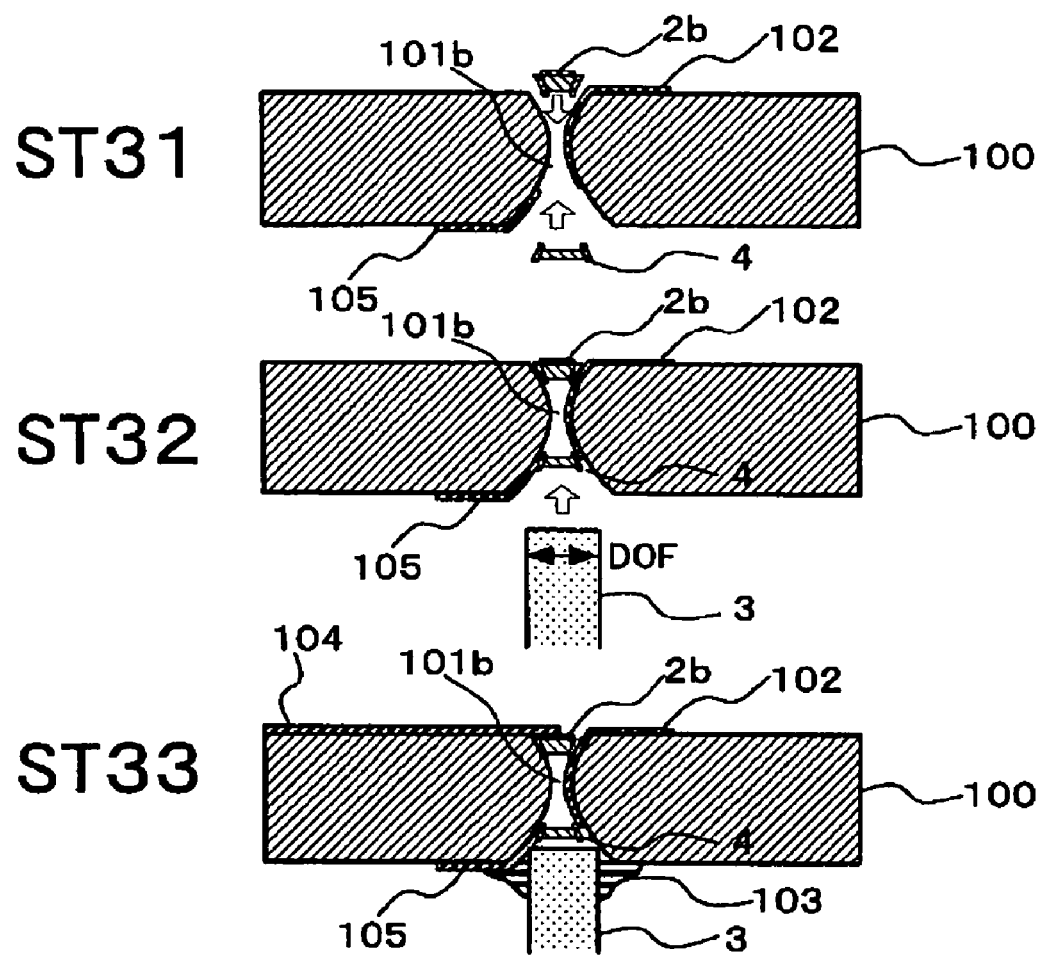

MANUFACTURING METHOD OF OPTICAL COMMUNICATION MODULE, OPTICAL COMMUNICATION MODULE, AND ELECTRONIC APPARATUS

RELATED APPLICATIONS

The present application claims priority to Japanese Patent Application No. 2003-064136 filed Mar. 10, 2003 which is hereby expressly incorporated by reference herein in its entirety.

BACKGROUND OF THE INVENTION

1. Field of the Invention

The present invention relates to a manufacturing method of an optical communication module, and particularly to a structure and a manufacturing method of the optical communication module, which couples an optical device to an optical fiber while preferably aligning them on a substrate.

2. Description of Related Art

An optical communication module couples an optical device such as a surface emitting laser and a photo-detector, which mutually convert an electrical signal and an optical signal via optical fiber. The optical communication module has attracted attention as a transmission means for communicating a large amount of information.

Conventionally, as for the optical coupling between an optical device and an optical fiber in a direction parallel to a substrate surface, for example, an optical device such as a surface emitting laser, as disclosed in Japanese laid-open patent application No. 14-296463, is mounted upright on a substrate, a V-shaped groove is formed on the substrate to hold an end part of the optical fiber, and the optical fiber is arranged so as to intersect a light-emitting surface or a light-receiving surface. For this arrangement, there has been used a method called visual alignment, in which the position of the V-shaped groove is monitored to align the optical device.

Furthermore, as a method for coupling an optical device and an optical fiber in a thickness direction of a substrate, as described in U.S. Pat. No. 5,904,545, for example, there has been proposed a technique, wherein the optical device is formed into a trapezoidal shape, a recessed part is provided at one surface of the substrate to fit the optical device thereto, and a through-hole penetrating up to the recessed part is formed on the other surface to insert the optical fiber thereto, so that an optical communication module is manufactured.

Structures of optical devices for receiving and transmitting an optical signal to be transmitted/received in a plane direction of a substrate are also disclosed in Japanese laid-open patent application No. 14-26440, and Japanese laid-open patent application No. 14-83953.

However, there have been various inconveniences in aligning an optical device and an optical fiber in the above-described related art. For example, in the technique disclosed in Patent Document 14-296463, a high-precision device is required for alignment and the alignment is performed one by one, which takes long time and entails an increase in manufacturing costs.

Furthermore, according to a method as disclosed in the above-described Patent Document U.S. Pat. No. 5,904,545, because the mounted trapezoidally-shaped optical device is supported at a bottom part of the recessed part to secure electrical coupling, there is a possibility that displacement occurs when the optical device is placed at the bottom part of the recessed part. In addition, because the step of forming the recessed part and the step of forming the through-hole are separate, there is no assurance that the through-hole is opened in such a manner that a central axis of the through-hole precisely coincides with a center of the recessed part. Therefore, even if the optical device happens to be placed precisely at the center of the recessed part, an optical axis of the optical fiber and a center of an emission optical axis of the optical device, which are inserted from the through-hole, do not surely coincide with each other. In the optical device such as a surface emitting laser, because a light-emitting point thereof is minute and the directivity of emitted light is strong, the optical fiber should be precisely brought into contact with the light-emitting region from a proper direction. Even a slight displacement of the optical fiber causes large light loss, which disables efficient optical communication.

Furthermore, although the optical devices described in the above-described Patent Documents 14-26440 and 14-83953 supports optical communication in plane directions, no concrete method for coupling optical fibers and the optical devices are provided.

SUMMARY OF THE INVENTION

The present invention is provides a manufacturing method of an optical communication module, which does not require alignment work of an optical device and an optical transmitter.

In order to solve the above-described problem, the present invention provides a manufacturing method of an optical communication module that optically couples an optical device and an optical transmitter, comprising: providing a tapered through-hole in a substrate; housing an optical device whose optical transmission point substantially coincides with a geometrical center in the tapered through-hole; and further inserting an optical transmitter having a larger diameter than a diameter of the optical device in the tapered through-hole housing the optical device.

According to the above-described method, an optical device and an optical transmitter are housed in one tapered through-hole. The optical device contacts an internal wall of the tapered through-hole at a position determined based on the diameter of the optical device. The optical transmitter also contacts the internal wall of the tapered through-hole at a position determined based on a diameter of an end part of the optical transmitter. As for the optical device, because the geometrical center coincides with the optical transmission point, the optical transmission point exists on a central axis of the through-hole. A core of the optical transmitter also coincides with the central axis of the through-hole. Consequently, both the geometrical center and the optical transmission point are aligned concentrically only by housing work (e.g., a housing or fixing operation), which largely reduces man hours and cuts manufacturing costs as compared to a conventional case where an optical device and an optical fiber are individually aligned one by one.

As for the present invention, the "optical device" refers to a general element receiving, and converting an optical signal into an electrical signal by photo-voltaic effect, photo-conductive effect, photo-emission effect, photon drug effect or the like, or those converting an electrical signal into an optical signal by electro-luminescence effect, injection type luminescence effect or the like. For example, as for the optical device converting an optical signal into an electrical signal, there are exemplified a photo detector such as a PD and a photo-transistor, a photo-cell, an infrared detector or the like. As for the optical device converting an electrical signal into an optical signal, there are exemplified a surface emitting laser (vertical cavity surface-emitting laser (VCSEL)), a semiconductor laser, a light-emitting diode or the like. In particular, the surface emitting laser is capable of constant current driving and has a narrow light radiation angle. Because the surface emitting laser has high utilization efficiency as long as it can be coupled to an optical transmitter properly, it is preferable as an optical device for an optical communication device. The present invention is preferably employed with respect to such an optical device having a small light-emitting area.

In particular, the optical device according to the present invention requires that the optical transmission point and the geometrical center substantially coincide with each other. The "optical transmission point" refers to a center point of a region emitting and receiving light in the optical device. In other words, the optical device is a device, in which when the device is housed in a tapered-hole having a concentric cross section, a line on which the optical device can transmit and receive light with maximum efficiency is located on a central axis of the tapered through-hole. It is preferable the outer diameter of the optical device is, for example, a conical shape with a top thereof cut, such that the optical device is stably housed with a large area contacting the wall surface of the tapered through-hole. Inclination of the conical side wall is adjusted to a shape of the internal wall of the tapered through-hole.

The "optical transmitter" refers to those such as an optical fiber, in particular, each core of these corresponds to a center of optical transmission. A cross-sectional shape thereof perpendicular to its axis is not limited to a particular shape, but circular, elliptical, rectangular, and other polygonal shapes are applicable.

The "optical communication module" refers to components or devices communicating information by using light as a medium and including an optical structure, at least, in a part thereof.

The "tapered through-hole" literally refers to a tapered hole, which is desirably pierced. The tapered internal wall may have an inclination angle with respect to a substrate surface, varying according to a depth of the through-hole, but at least, it is necessary that the internal wall extends continuously and that the central axis of the hole is a straight line. With respect to the cross-sectional shape of the tapered through-hole, various shapes such as circular, elliptical, rectangular, and polygonal shapes are applicable, and it is preferable to form the through-hole to shapes corresponding to the shapes of the optical device and the optical transmitter to be housed therein so as to attain more mutual contacting points and stability.

The "diameter" refers to a diameter in the case where the cross-sectional shapes of the optical device, the optical transmitter, and the through-hole are circular, but in other cases, refers to maximum widths. This is because it is the widths defining contacting positions when the optical device and the optical transmitter are housed in the tapered through-hole.

After the step of housing the optical device, there can be further included the step of housing a second optical device, whose diameter is larger than the diameter of the first optical device and smaller than the diameter of the optical transmitter in the tapered through-hole. According to this method, it is possible to house another optical device in addition to the first optical device housed in advance in the same through-hole without any alignment work. As for such a combination of a plurality of optical devices, for example, a combination of a light-transmitting element such as a surface emitting laser and a light-receiving element such as a photo-diode can be used. The first optical device (housed in advance), which is not directly coupled optically to the optical transmitter, can be used for another purpose.

Furthermore, the present invention provides a manufacturing method of an optical communication module that optically couples an optical device and a transmitter, comprising: providing a double-ended tapered through-hole (hour-glass shaped) having a constriction portion inside a substrate and openings on both sides of the substrate so as to be opened bi-directionally; housing an optical device from one of the openings in the double-ended tapered through-hole, whose optical transmission point substantially coincides with a geometrical center and that has a smaller diameter than a diameter of one of the openings of the double-ended tapered through-hole; and housing an optical transmitter having a smaller diameter than a diameter of the other opening of the double-ended tapered through-hole, from the other opening in the double-ended tapered through-hole.

According to the above-described method, the through-hole is opened bi-directionally as viewed from the constriction portion, and either the optical device or optical transmitter, or both can be housed in each direction. The optical device contacts an internal wall of the tapered through-hole at a position determined based on the diameter of the optical device. The optical transmitter also contacts the internal wall of the tapered through-hole at a position determined based on the diameter of an end part the optical transmitter. As for the optical device, because the geometrical center substantially coincides with the optical transmission point, the optical transmission point exists on a central axis of the through-hole. As for the optical transmitter, a core thereof coincides with the central axis of the through-hole. Because both tapered shapes inside of the through-hole are concentric, both of the optical device and the optical transmitter can consequentially be aligned concentrically only by housing work, which can largely reduce man hours and cut manufacturing costs as compared to a conventional case where an optical device and an optical fiber are individually aligned one by one.

Before the step of housing the optical transmitter, it is preferable to include the step of housing an optical device from the other opening of the double-ended tapered through-hole, whose diameter is smaller than the diameter of the optical transmitter. This method enables optical coupling between the optical transmitter and the optical device in one of the tapered shapes of the through-hole and the optical device housed in the other tapered shape can be used for another purpose. Furthermore, by further inserting another optical transmitter into the other tapered shape, light can be transmitted and received independently, or interrelatedly with each other in both the tapered shapes. Thus, according to the present invention, forming one through-hole can provide a plurality of optical coupling structures.

Before the step of housing the optical device, it is further preferable to include the step of forming an electrode wiring for conduction with an electrode provided in a part of the optical device. According to this method, in the case where the electrodes of the optical device are provided, for example, in both bottom surfaces of a trapezoidal shape thereof, wiring to be coupled to the electrode can be formed in advance (for example, a part of the internal wall of the through-hole). At this time, when the optical device is housed in the through-hole, the electrode can come into contact with the wiring provided in the part of the internal wall to establish electrical coupling.

After the step of housing the optical device, it is further preferable to include the step of forming an electrode wiring for conduction with an electrode provided in the optical device. According to this method, the electrode wiring can be brought into electrical coupling with the electrode of the optical device (for example, the electrode formed in the bottom surface of the optical device) on the substrate surface or in the vicinity thereof when the optical device is housed in the through-hole.

The steps of forming the through-hole preferably comprise: irradiating the substrate, using material with a light-transmitting property, by relatively moving a femto-second pulse laser in an axial direction of the through-hole; and removing a region changed in property by the irradiation of the femto-second pulse laser to leave (bore) the through-hole. According to these steps, the movement of the femto-second pulse laser allows the tapered through-hole to be formed in the substrate having the light-transmitting property such as glass and quartz. Intensity, pulse width, and irradiation time of laser beam can be changed according to a desired tapered shape of the through-hole.

The steps of forming the through-hole may comprise: irradiating the substrate, using material with a light-transmitting property, by the femto-second pulse laser via a diffraction grating in the axial direction of the through-hole; and removing the region changed in property by the irradiation of the femto-second pulse laser to leave (bore) the through-hole. According to these steps, because light intensity distribution, matching the tapered shape of the through-hole, is obtained by the diffraction grating, the tapered through-hole can be formed, for example, even when the substrate or light is not moved relatively.

After the step of housing the optical device or the optical transmitter, it is preferable to include the step of fixing a periphery of the housed optical device or the housed optical transmitter with a resin. According to this step, the housed optical device or the housed optical transmitter can be easily fixed with a resin. If a light-cured resin is used for the resin, by supplying light by light irradiation from outside or through the optical transmitter or the optical device (in the case of a light-emitting element), the fixing resin can be cured, which makes the fixing easier. In the case where the resin has a light-transmitting property, the resin is charged into the through-hole before or after housing the optical device and the optical fiber, and the resin is cured after the position is determined. Thereby the optical device and the optical transmitter can be fixed securely.

In the step of housing the optical device, it is preferable to use an optical device formed in such a manner that a side surface of the optical device contacting the internal wall of the through-hole inclines corresponding to a tapered shape of the internal wall at a contacting position. Such a three-dimensional shape of the optical device is a trapezoid or conical/pyramid shape with a top thereof cut (truncated). This is because this shape allows the optical device to be housed in the through-hole while being oriented to a predetermined direction (orientation with the narrow bottom surface thereof located on the inner side) by the step of settling the optical device in the through-hole while flowing a slurry over the substrate and through-hole with the optical device suspended in a fluid of the slurry. In addition, a contacting area between the side surface of the optical device and the internal wall of the through-hole becomes larger, which enables stable housing.

In particular, it is preferable that the optical device has such an inclination for the side surface where the optical device-contacts the internal wall of the through-hole in the vicinity of a bottom surface on the insertion side of the optical device when housed in the through-hole. When the optical device has such a shape, the optical device contacts the internal wall of the through-hole in the vicinity of the bottom surface on the insertion side of the optical device and is positioned when housed in the through-hole. Therefore, the optical device can be securely housed stably at a designed position. Furthermore, by providing the electrode in the bottom surface on the insertion side of the optical device and providing the electrode wiring on the internal wall side of the through-hole contacting the electrode, the optical device can preferably be coupled electrically.

The present invention also provides an electronic apparatus comprising the optical communication module manufactured by the manufacturing method of the optical communication module according to the present invention. Because the electronic apparatus comprises the optical communication module according to the present invention, there can be provided an electronic apparatus capable of optical communication with small light loss without any particular alignment work at low cost, which is excellent as a latest apparatus required to perform high-speed information processing.

The "electronic apparatus" refers to general apparatuses comprising the optical communication module according to the present invention, which has predetermined functions. A structure thereof is not limited, and there are included, for example, personal computer, cellular phone, video camera, head mount display, rear type or front type projector, fax machine with display function, finder of digital camera, portable TV, DSP device, PDA, electronic data book, electronic bulletin board, advertisement display, which comprises the above-described display device.

Furthermore, the present invention provides an optical communication module for optically coupling an optical device and an optical transmitter, comprising: a substrate provided with a tapered through-hole having a first opening with a larger diameter than a diameter of an optical device to be housed and a diameter of an end surface of an optical transmitter to be housed, and a second opening with a smaller diameter than the diameter of the optical device and the diameter of the end surface of the optical transmitter; and electrode wiring for the optical device that is formed from any one of the first opening and the second opening along an internal wall of the tapered through-hole. According to the above-described constitution, the optical device and the optical transmitter can be housed concentrically in the tapered through-hole. In addition, power can be supplied to the optical device through the electrode wiring.

Furthermore, the present invention provides an optical communication module that optically couples an optical device and an optical transmitter, comprising: a substrate provided with a double-ended tapered through-hole having a constriction portion with a smaller diameter than a diameter of an optical device to be housed and a diameter of an end surface of an optical transmitter to be housed and having openings on both sides of the substrate so as to be opened bi-directionally; and an electrode wiring for the optical device that is formed, at least, from one of the openings along an internal wall of the double-ended tapered through-hole. According to the above-described constitution, the optical device and the optical transmitter can be housed from the same opening side or from different opening sides, and concentrically in the tapered through-hole. In addition, power can be supplied to the optical device through the electrode wiring.

BRIEF DESCRIPTION OF THE DRAWINGS

FIG. 2 shows cross-sectional views of the steps illustrating a forming method of a through-hole in detail.

FIG. 3 shows views illustrating a shape of the tapered through-hole of the optical communication module according to the first embodiment.

FIG. 4 shows views illustrating a structure of an optical device of the optical communication module according to the first embodiment. FIG. 4 (a) is a cross-sectional view and FIG. 4(b) is a plan view.

FIG. 6 shows views illustrating a structure of an optical device of the optical communication module according to the second embodiment.

FIG. 8 shows views illustrating a structure of an optical device of the optical communication module according to the third embodiment.

FIG. 9 shows cross-sectional views of the manufacturing steps illustrating a manufacturing method of an optical communication module according to a fourth embodiment of the present invention.

DETAILED DESCRIPTION OF EXEMPLARY EMBODIMENTS

Figure 1:
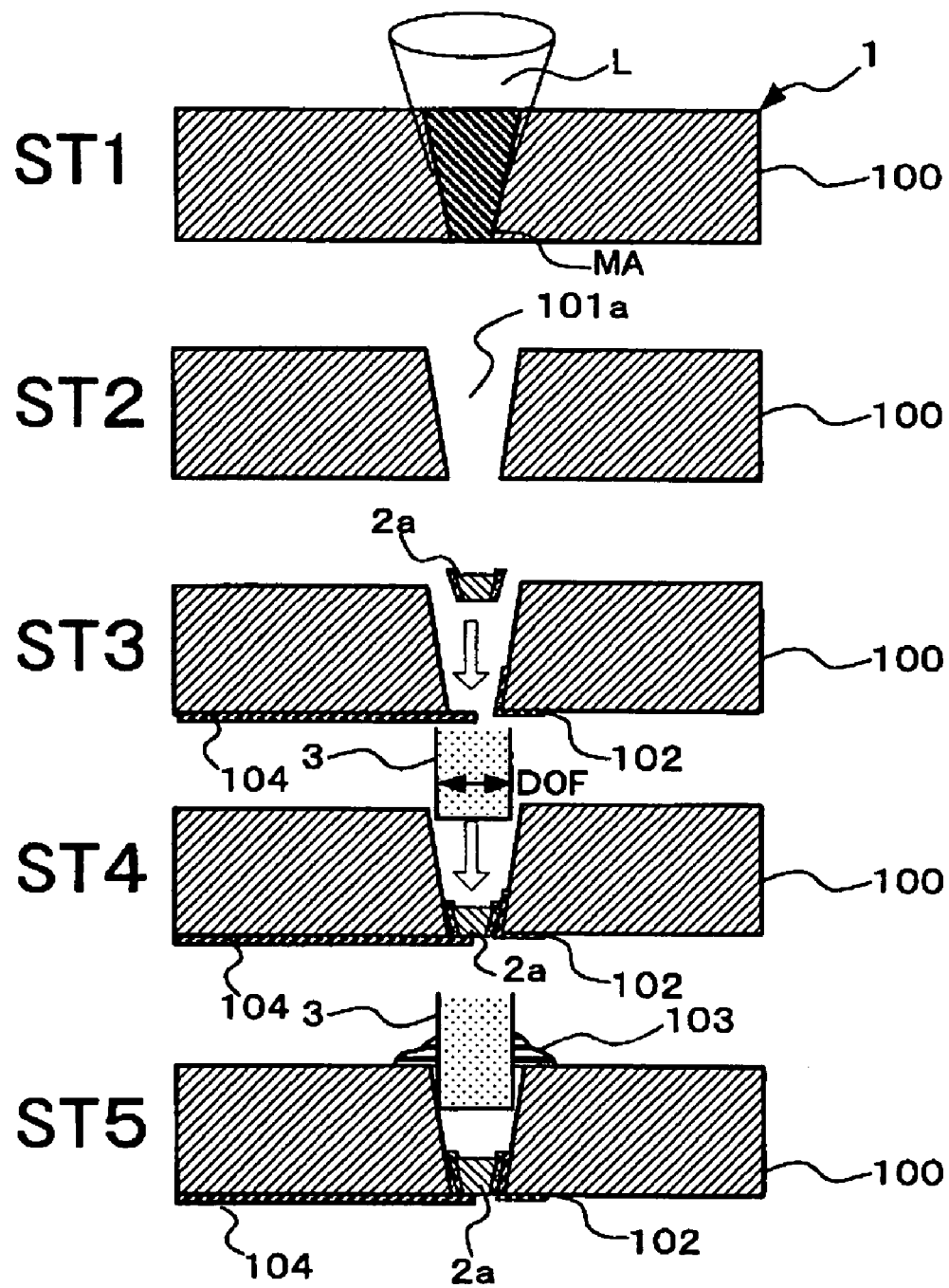
FIG. 1 shows cross-sectional views of the manufacturing steps illustrating a manufacturing method of an optical communication module according to a first embodiment of the present invention.

Hereinafter, preferred embodiments of the present invention will be described referring to the drawings.

First Embodiment

A first embodiment of the present invention relates to an example in which an optical device and an optical fiber are mounted inside a tapered through-hole with one end open thereof.

FIG. 1 shows cross-sectional views of the manufacturing steps illustrating a manufacturing method of an optical communication module according to a first embodiment. Although FIG. 1 shows expanded cross-sectional views with respect to one through-hole, cases where a plurality of through-holes is formed on one substrate can be considered similarly.

Tapered Through-hole Forming Step: ST1

First, a tapered through-hole 101a is provided in a substrate 100. As for the substrate 100, although a substrate with or without a light-transmitting property may be used, a material, for which piercing work is easy and which does not cause deformation and subsequent displacement after manufacturing the optical communication module, is suitable. Particularly, in the present embodiment, a femto-second pulse laser is used to provide a high-precision tapered through-hole. Therefore, as for the substrate 100, a material with a light-transmitting property such as glass and quartz is used.

The femto-second pulse laser oscillates at a pulse width of tens of femto-seconds and is capable of generating periodic pulses by synchronizing waves distributed in a wide frequency band. The laser, having a short wavelength, changes the property of the material that is irradiated. The femto-second pulse laser can change an area of a region, which can be changed in a property, that is, a cross-sectional area of a through-hole according to an energy density, irradiation time, and distance from a laser emitting point to a focal point. A tapered through-hole having an arbitrary diameter can be attained by changing irradiation conditions of the laser, or by using a diffraction grating with the laser. Because these conditions are experimentally obtained, the irradiation conditions are determined by conducting measurements in each case according to the substrate material.

Figure 2A:
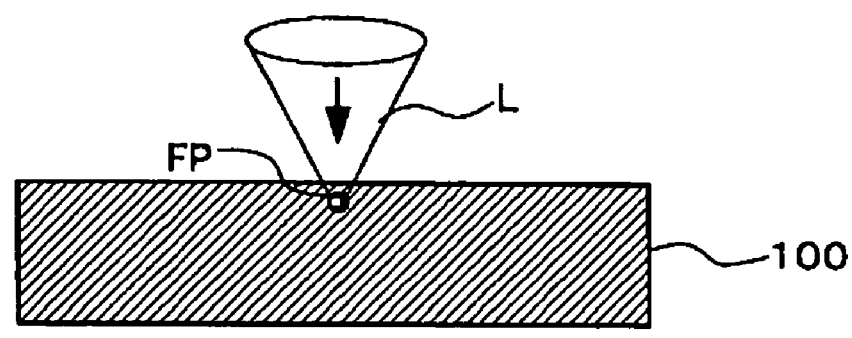
FIG. 2(a) shows a method to move a relative position of a femto-second pulse laser and FIG. 2(b) shows a method in which a diffraction grating is used in combination.
Figure 2A:
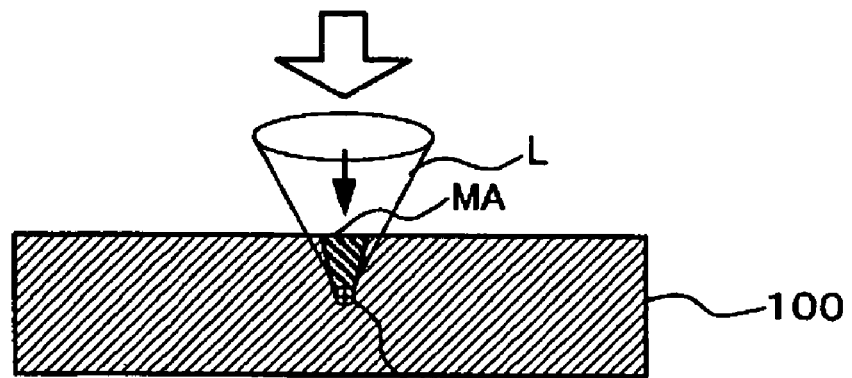

FIG. 2(a) is a cross-sectional view showing the step of forming a through-hole while moving the femto-second pulse laser. As shown in FIG. 2(a), a relative distance between light L and the substrate 100 is changed to move a position of a focal point while irradiating a surface of the substrate 100 with the light L of the femto-second pulse laser from a direction perpendicular to the surface of the substrate 100. As for the movement of the focal point, the laser device may be moved, the substrate may be moved on a stage, or both may be moved.

A region irradiated by the femto-second pulse laser becomes a fragile property-changed region MA. After laser irradiation, the property-changed region MA, which has been changed in property by the irradiation by the femto-second pulse laser, is removed so that the through-hole emerges. A removal method of the property-changed region can be selected according to the substrate material. For example, in the case where quartz glass is used for the substrate, the substrate after laser irradiation is immersed in a solvent such as HF and etched to remove the property-changed region MA. By the wet etching work, the property-changed region MA is removed to form the tapered through-hole 101a (ST2 of FIG. 1).

Figure 2B:
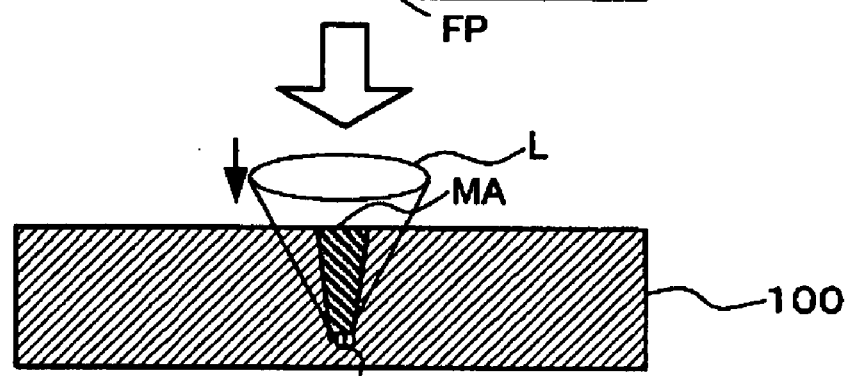
Figure 2B:
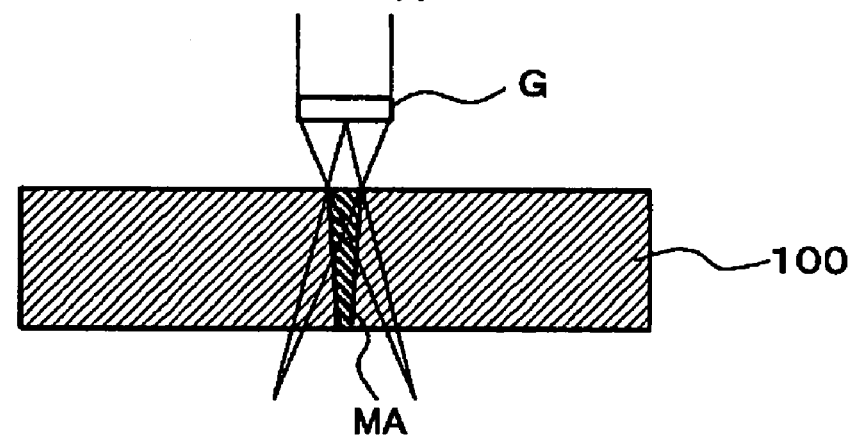

FIG. 2(b) is a cross-sectional view showing the step relating to a forming method of a through-hole using both of the femto-second pulse laser and the diffraction grating. As shown in FIG. 2(b), by irradiating the substrate with the femto-second pulse laser via a diffraction grating G, light intensity distribution, in which intensive light is concentrated on a part corresponding to the through-hole according to the present invention, is obtained. Accordingly, when the diffraction grating is used in combination, the tapered through-hole can be formed even if the relative distance between the substrate and the laser beam is unchanged.

As long as a tapered shape can be formed in the substrate, other methods, for example, etching or drilling processes may be used to form the through-hole.

Subsequently, an electrode wiring 102 is formed continuously from one tapered opening with a smaller hole diameter to the inside of the through-hole 101a. The electrode wiring 102 is formed so as to be electrically coupled to an electrode provided on a bottom part on the insertion side of an optical device 2a, which is mounted inside of the through-hole 101a. For example, by a sputtering method using a mask, a metal layer is provided in such a manner that metal intrudes up to the internal surface of the through-hole 101a.

Figure 4A:
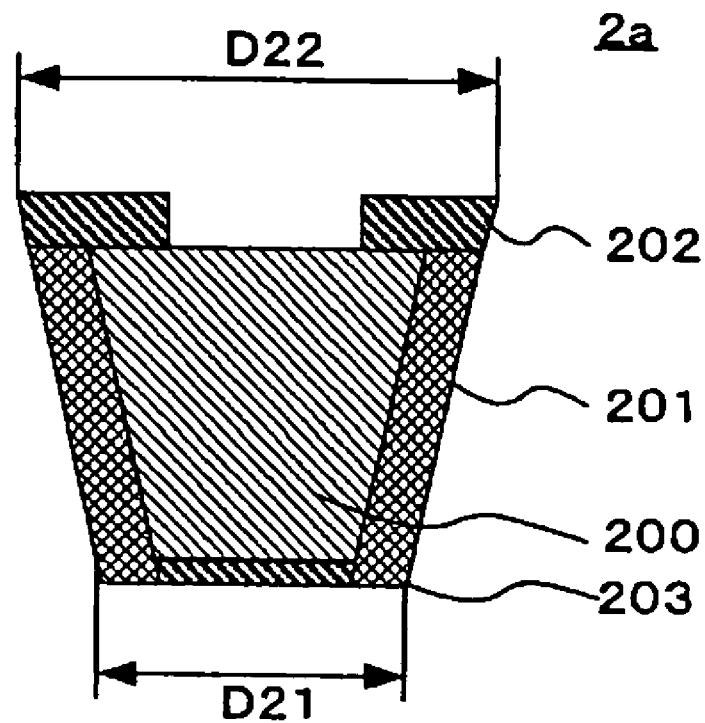

Similarly, there is provided an electrode wiring 104, which is coupled to an electrode 203 (refer to FIG. 4(a)) provided on a bottom surface of the optical device 2a. The electrode wiring 104 can be formed using a publicly known metal patterning technique. For example, the electrode wiring 102 relating to the other electrode coupling, which is provided in advance, is masked to form the metal layer on the substrate 100 and then the metal layer is selectively etched into a wiring shape.

Figure 3A:
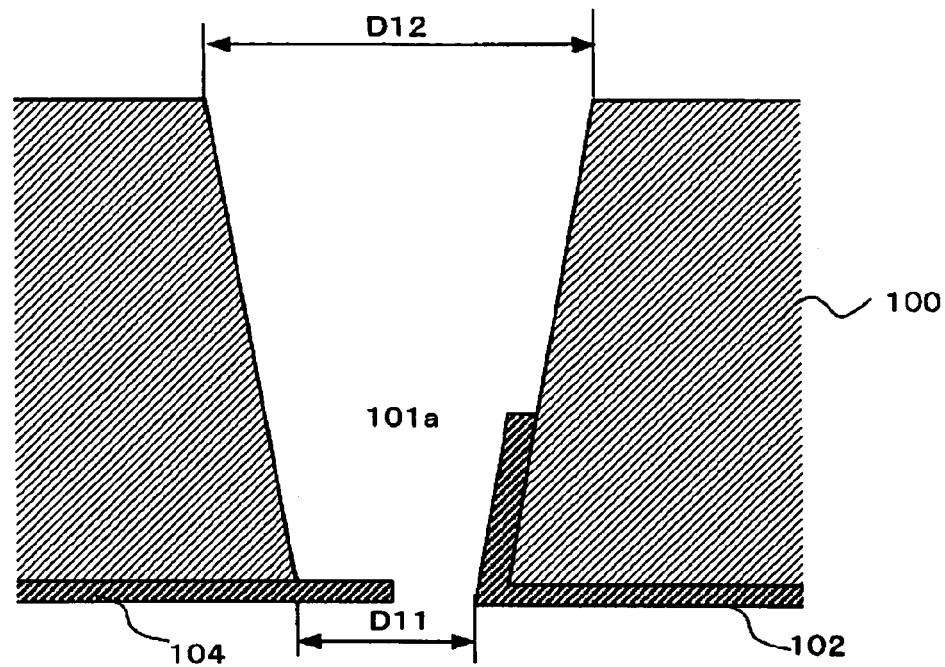
FIG. 3(a) is a cross-sectional view and FIG. 3(b) is a plan view.
Figure 3B:
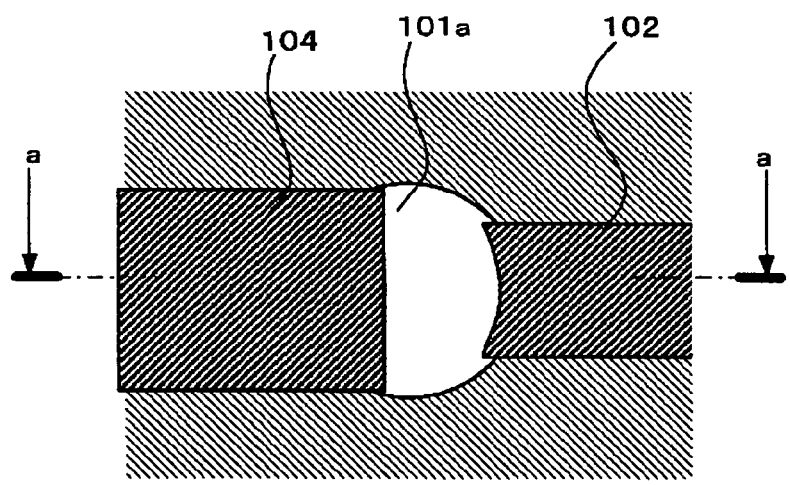

FIG. 3 shows a shape of the tapered through-hole formed in such steps. FIG. 3(a) is a cross-sectional view and FIG. 3(b) is a plan view. As shown in FIGS. 3(a) and 3(b), the tapered through-hole 101a is a pierced hole having a tapered shape, in which a diameter D11 of one opening thereof is smaller than a diameter D12 of the other opening. In a part of the one opening with the smaller diameter, the electrode wiring 102 is formed continuously to the inside of the through-hole 101a. The electrode wiring 102 may cover the whole internal wall of the through-hole 101a instead of a part of an internal wall. According to the present embodiment, because the coupling with the other electrode of the optical device is established in the same surface, in which the electrode wiring 102 is provided, patterning is performed in such a manner that enough margin is secured not to short-circuit the electrode wiring 102 and the electrode wiring 104.

Optical Device Mounting Step: ST3

Next, the optical device 2a is housed inside of the tapered through-hole 101a formed in the above-described steps. As for the optical device 2a, a light-receiving element such as photodiode, or a light-transmitting element such as a surface emitting laser may be selected based on whether the optical communication module is used for receiving or transmitting light.

Figure 4B:
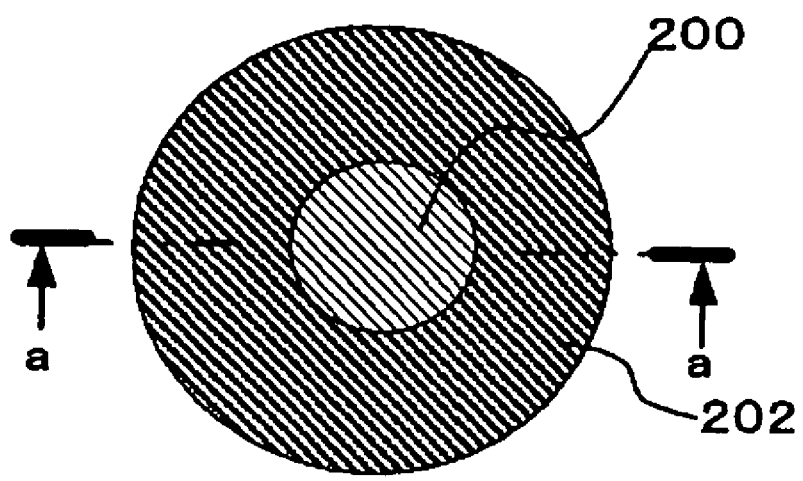

FIG. 4 shows a structure of the optical device 2a. FIG. 4(a) is a cross-sectional view, and FIG. 4(b) is a plan view. As shown in FIG. 4, the optical device 2a according to the present embodiment is a surface emitting laser, in which a center of a light-emitting region coincides with a geometrical center. Although a detailed drawing will be omitted for a body 200, an insulating film 201 for insulation is provided on a side surface of the body. In a wider bottom surface having a diameter D22, an electrode 202 is provided surrounding circumferentially along an edge of the wider bottom surface. The optical device 2a emits light in a thickness direction thereof and the light is emitted from an opening in the center portion, which is not shielded by the electrode 202. In a narrower bottom surface having a diameter D21, the other electrode 203 is provided. Such a minute structure of the optical device is also disclosed in Japanese laid-open patent application No. 14-26440, and Japanese laid-open patent application No. 14-83953.

At this time, it is preferable that a shape of the optical device 2a and the tapered through-hole 101a have the following relations.

1. Shapes of cross sections perpendicular to axial directions are similar. By making the shapes similar, a contacting region becomes larger when the optical device is housed, which brings about more stable housing of the optical device. According to the present embodiment, because the through-hole has a conical shape and its cross-section has a circular shape, the optical device is also designed to have a right conical shape with a top thereof cut. In the case where the through-hole 101a has a pyramid shape, the optical device also has a pyramid shape with a top thereof cut corresponding to it.

2. Inclination of the internal wall of the through-hole and the side surface of the optical device are approximate. By making the inclination approximately the same, the contacting area becomes larger when the optical device is housed, which brings about more stable housing of the optical device similarly to the above-described. According to the present embodiment, because the through-hole has a conical shape, the optical device is designed to have a right conical shape with the top thereof cut.

3. When the optical device is housed in the through-hole, the side inclination of the optical device is adjusted in such a manner that the optical device contacts the internal wall of the through-hole on the periphery of a bottom surface thereof, which is the opposite side of the direction in which the optical device is inserted into the through-hole (the bottom surface provided with the electrode 202 in FIG. 4). In this way, the optical device is held in the vicinity of the bottom surface thereof in such a manner as to be fixed, which can secure the contact with the internal wall and the stable housing in a designed position.

4. The maximum diameter of the optical device (D22 in FIG. 4) is larger than the minimum diameter D11 and smaller than the maximum diameter D12 of the through-hole 101a. These magnitude relations allow the optical device to contact the internal wall at any position inside of the through-hole and to be housed stably. When the optical device 2a is inserted until it is brought into contact with the internal wall of the through-hole 101a, the dimensions are preferably adjusted so that the other electrode 203 of the optical device 2a reaches the smaller opening of the through-hole, and electrically couples with the electrode wiring 104.

In order to house the optical device 2a in the through-hole 101a, although it can be mechanically mounted individually, it is efficient to use such a method as described in U.S. Pat. No. 5,904,545. Specifically, under a condition that a number of through-holes 101a as shown in FIG. 3 are formed in the substrate 100, a number of optical devices 2a each having a constitution as shown in FIG. 4 are mixed into a predetermined liquid and made into slurry (turbidity solution). The optical devices 2a are made to flow through the slurry while holding the substrate in such an orientation that the opening with the maximum diameter of the through-hole 101a is facing upward. The optical device 2a comes into the through-hole 101a by gravitation and sinks in such an orientation that the wider bottom part is facing upward by itself, until it comes into contact with the internal wall of the through-hole 101a and stops.

As for the optical device 2a housed in the through-hole 101a, the surface in which the electrode 202 is provided, is oriented to the opening of the maximum diameter of the through-hole. Because the electrode wiring 102 produced in the previous step exists there, the electrode 202 of the optical device 2a is electrically coupled to the electrode wiring 102 to establish electrical coupling. Furthermore, the other electrode 203 of the optical device reaches the opening with the minimum diameter of the through-hole 101a and is electrically coupled to the electrode wiring 104 to establish electrical coupling.

Optical Fiber Mounting Step: ST4

Next, an optical fiber 3 is inserted from the opening side of the maximum diameter of the tapered through-hole 101a so as to be housed inside of the through-hole. It is preferable that a shape of the optical fiber 3 and the tapered through-hole 101a have the following relations.

1. Shapes of cross sections perpendicular to axial directions are similar. By making the shapes similar, a contacting region becomes larger when the optical fiber is housed, which brings about more stable housing of the optical fiber. According to the present embodiment, because the through-hole has a conical shape and its cross-section has a circular shape, the optical fiber is also formed into a columnar shape, which is typically used. In the case where the through-hole 101a has a pyramid shape, the optical fiber is also formed so that, at least, an end surface thereof is rectangular.

2. A diameter DOF of the optical fiber is larger than the minimum diameter D11 and smaller than the maximum diameter D12 of the through-hole 101a, and further, larger than the maximum diameter D22 of the optical device 2a. These magnitude relations allow the end surface of the optical fiber 3 to contact the internal wall at any position inside of the through-hole, which is closer to the opening with the maximum diameter with respect to the optical device 2a and to be housed stably.

Fixing Step: ST5

Next, a resin adhesive 103 is applied on the periphery of the optical fiber 3 and/or the optical device 2a to fix the optical fiber 3 and/or the optical device 2a. As for the adhesive, various curable adhesives including reactive-cured adhesive, which is generally used as a resin adhesive, thermosetting adhesive, light-cured adhesive such as UV-cured adhesive, and anerobic-cured adhesive, can be used. With respect to compositions of these adhesives, any adhesive including such as epoxy adhesive, acrylate adhesive, and silicon adhesive can be applied.

However, according to the present embodiment, resin adhesive having a light-transmitting property is particularly preferable. This is because it transmits light, thereby light loss can be suppressed even if the resin is charged in an optical transmitter. Furthermore, according to the present embodiment, because the material having a light-transmitting property is used for the substrate 100, if the light-cured adhesive is used for the resin material, the optical device and the optical fiber can be easily fixed by irradiating them with light from the outside of the substrate after applying the adhesive.

Although ST 5 of FIG. 1 illustrates a case where the resin adhesive 103 is used only to fix the optical fiber 3, it is not limited to such an example. That is, the resin adhesive 103 can be applied before and after housing the optical device 2a in the through-hole 101a. Furthermore, after housing the optical device 2a, the resin adhesive 103 having a light-transmitting property is charged into the through hole 101a and then the optical fiber 3 is housed to be positioned, followed by curing the adhesive, which can securely fix the optical device and the optical fiber.

The formation of the electrode wiring 104 may be performed in any step after housing the optical device 2a in the through-hole 101a.

According to the first embodiment, because the pair including the optical device 2a and the optical fiber 3 is housed in one tapered through-hole 101a, the optical device and the optical fiber contact the internal wall of the tapered through-hole at the positions based on the diameters of the optical device and the optical fiber. At this time, because the geometrical center of the optical device 2a substantially coincides with the center of the light-emitting region, an optical transmission point exists on a central axis of the through-hole 101a and a core of the optical fiber 3 coincides with the central axis of the through-hole 101a. Consequently, both the optical device and the optical fiber are positioned concentrically only by housing work, which can largely reduce man hours and cut manufacturing costs, as compared to a conventional case where the optical device and the optical fiber must be aligned one by one.

According to the first embodiment, the optical device 2a has a conical shape with the top thereof cut. Therefore, by forming a slurry containing the optical devices and flowing the slurry on the substrate 100, in which the through-hole 101a faces upward, the orientation of the optical device coming into the through-hole is set by itself to position the optical device at a predetermined position in the through-hole.

At this time, because the shape of the cross section perpendicular to the axial direction of the optical device 2a is similar to the shape of the cross section of the through-hole 101a, the contacting region becomes larger when the optical device is housed in the through-hole, which brings about stable housing.

Furthermore, the inclination of the side surface of the optical device 2a is adjusted so that the optical device 2a contacts the internal wall of the through-hole 101a on the periphery of the bottom surface of the optical device, which is the opposite side of the direction in which the optical device is inserted into the through-hole. In this way, the optical device is held in the vicinity of the bottom surface thereof in such a manner as to be fixed, which can secure the contact with the internal wall and the stable housing in a designed position. In contrast, in the related art, although the recessed part for housing the optical device is tapered, the optical device makes contact at the bottom surface, which may cause displacement. Accordingly, the present invention is advantageous in that no displacement is caused in either of the axial direction of the through-hole or the direction perpendicular to the axis.

Furthermore, because the maximum diameter D22 of the optical 2a is larger than the minimum diameter D11 and smaller than the maximum diameter D12 of the through-hole 101a, the optical device can contact the internal wall at any position inside the through-hole and be housed stably.

Similarly, according to the first embodiment, because the through-hole 101a has a conical shape, and the shape of the cross section of the through-hole, perpendicular to the axial direction, is similar to the shape of the end surface of the optical fiber 3, the contacting region becomes larger when the optical fiber is housed, which allows the optical fiber to be housed more stably.

Furthermore, because the diameter DOF of the optical fiber 3 is larger than the minimum diameter D11 and smaller than the maximum diameter D12 of the through-hole 101a, the end surface of the optical fiber 3 can contact the internal wall at any position inside of the through-hole, which is closer to the opening with the maximum diameter with respect to the optical device 2a, and be housed stably.

According to the first embodiment, because the electrode wiring 102 is formed, extending up to the inside of the through-hole 101a, just housing the optical device 2a in the through-hole enables the electrode 102 to be electrically coupled to the electrode 202, which is provided on the bottom surface, facing the side of the insertion direction, of the optical device 2a.

Furthermore, because the electrode wiring 104, which is for conduction with the electrode 203 provided in the optical device 2a, is formed before the step of housing the optical device 2a, the electrical coupling of the electrode wiring to the other electrode of the optical device can be established.

According to the first embodiment, because the femtosecond pulse laser is used to form the tapered through-hole 101a, a tapered through-hole extending uniformly without any deflection of an axial center thereof can be formed with relative ease.

Furthermore, according-to the first embodiment, because the light-cured resin adhesive 103 is used, the optical device 2a and the optical fiber 3 can be fixed with ease.

Second Embodiment

Figure 5:
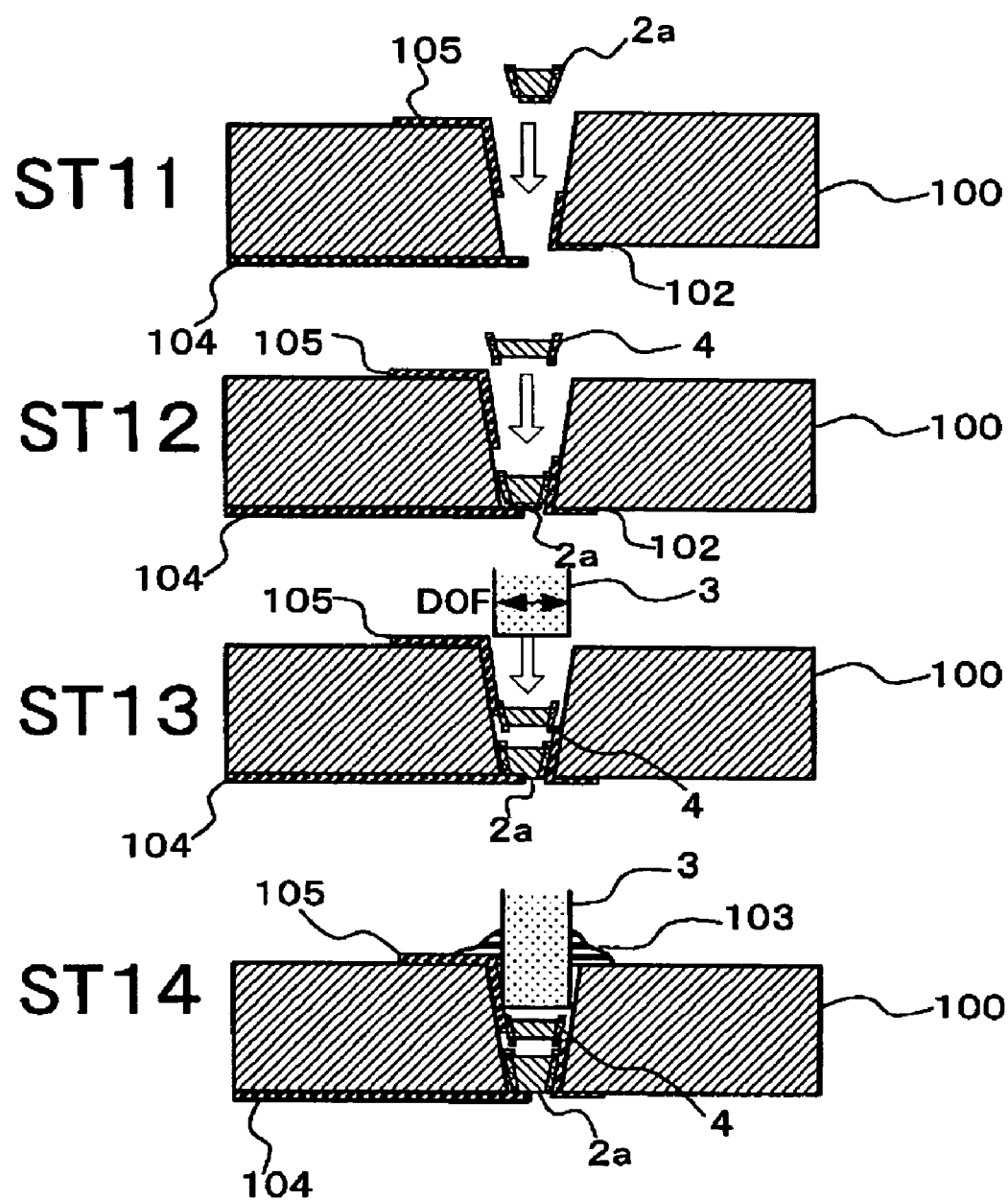
FIG. 5 shows cross-sectional views of the manufacturing steps illustrating a manufacturing method of an optical communication module according to a second embodiment of the present invention.

According to a second embodiment of the present invention, another optical device is further housed in one through-hole before housing an optical fiber. FIG. 5 shows cross-sectional views of manufacturing steps illustrating a manufacturing method of an optical communication module according to the second embodiment of the present invention.

The present embodiment is similar to the first embodiment except for mounting of another optical device 4. Accordingly, the forming step of the tapered through-hole 101a corresponds to ST1 and ST2 of FIG. 1, the mounting step of the optical device 2a (ST11) corresponds to ST3 of FIG. 1, the mounting step of the optical fiber 3 (ST13) corresponds to ST4 of FIG. 1, and the fixing step (ST14) corresponds to ST5 of FIG. 1. Therefore, the same members and shapes as those of the first embodiment are indicated by the same numerals and signs and their description will be omitted.

However, according to the present embodiment, because the other optical device 4 mounted later makes a direct optical coupling with the optical fiber 3, the optical device 2a mounted in advance is, for example, a device whose light-emitting direction is opposite (for example, upward in FIG. 5).

Furthermore, because the electrode wiring 102 provided before housing the optical device 2a is shared by the two optical devices, it is extended up to a fixing position of the optical device 4, which is to be inserted later.

Furthermore, in addition to the electrode wiring 102, an electrode wiring 105 for electrically coupling to the other electrode of the optical device 4 is formed from the opposite surface side of the substrate 100 to the inside of the through-hole 101a.

Another Optical Device Mounting Step: ST12

After housing the optical device 2a, the optical device 4 is further housed in the tapered through-hole 101a. As for the optical device 4, the same light-transmitting element as that of the first embodiment may be used, but the present embodiment employs a photo-detector, which is a light-receiving element.

Figure 6A:
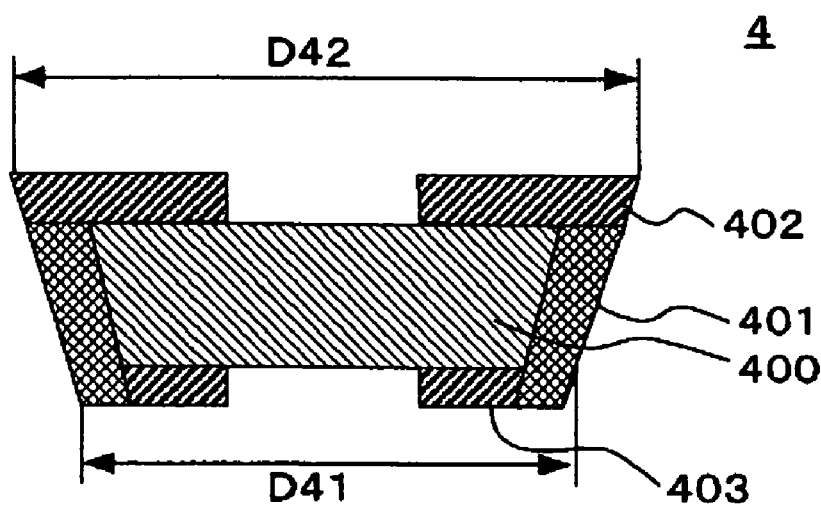
FIG. 6(a) is a cross-sectional view and FIG. 6(b) is a plan view.
Figure 6B:
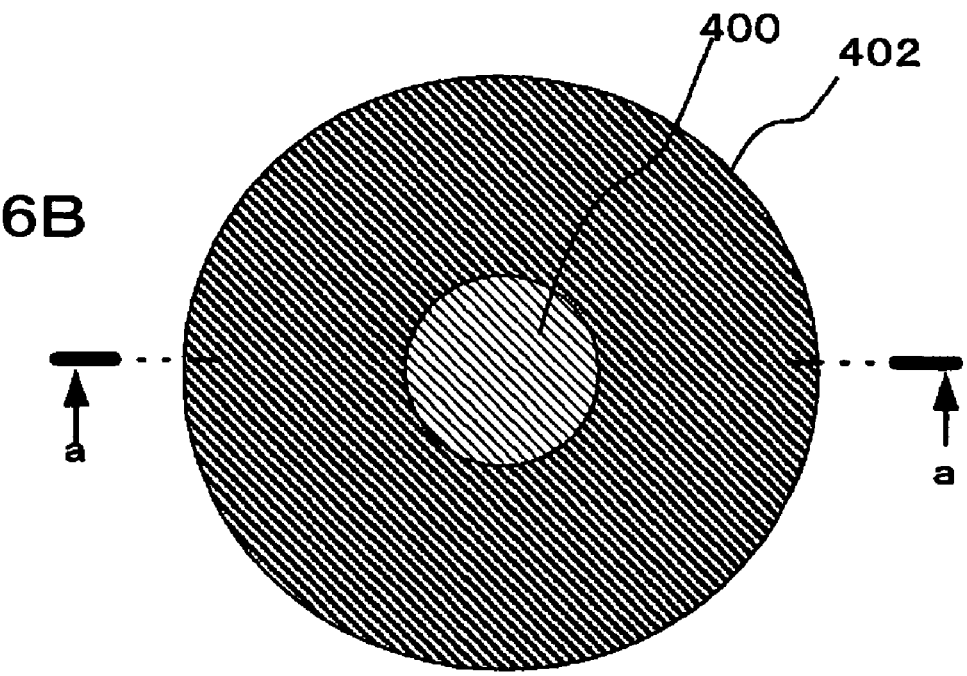

FIG. 6 shows a structure of the optical device 4. FIG. 6(a) is a cross-sectional view, and FIG. 6(b) is a plan view. As shown in FIG. 6, the optical device 4 according to the present embodiment is a photo-detector, which is formed in such a manner that an optical transmission point thereof, that is, a center of a light-receiving region coincides with a geometrical center. Although a detailed drawing of a body 400 will be omitted, an insulating film 401 for insulation is provided on a side surface of the body. On a wider bottom-surface having a diameter D42, one electrode 402 is provided circumferentially along an edge of the wider bottom surface. On a narrower bottom surface having a diameter D41, the other electrode 403 is provided circumferentially along an edge of the narrower bottom surface. Because the optical device. 4 is interposed between the optical device 2a and the optical fiber 3, the electrodes should be taken out along an internal wall of the through-hole 101a. Therefore, the electrode 403 provided on the side of the bottom surface with a smaller area is also arranged circumferentially so as to contact the internal wall of the through-hole, and shares the electrode wiring 102 with the optical device 2a. The other electrode 402 is coupled to the electrode wiring 105, which is provided from the opposite surface side of the substrate because if electrode wiring for the electrode 402 is arranged from the same surface side of the electrode wiring 102, a short-circuit may occur.

It is preferable that a shape of the optical device 4 and the tapered through-hole 101a have the following relations.

1. Shapes of cross sections perpendicular to axial directions are similar. By making the shapes similar, a contacting region becomes larger when the optical device 4 is housed, which brings about more stable housing of the optical device 4. According to the present embodiment, because the through-hole has a conical shape and its cross-section has a circular shape, the optical device 4 is also formed into a right conical shape with a top thereof cut. In the case where the through-hole 101a has a pyramid shape, the optical device also has a pyramid shape with the top thereof cut corresponding to it.

2. Inclination of the internal wall of the through-hole and the side surface of the optical device are approximately the same. By making the inclination approximately the same, a contacting area becomes larger when the optical, device is housed, which brings about more stable housing of the optical device similarly to the above-described. According to the present embodiment, because the through-hole has a conical shape, the optical device 4 is formed into a right conical shape with the top thereof cut.

3. When the optical device is housed in the through-hole, the side inclination of the optical device is adjusted in such a manner that the optical device contacts the internal wall of the through-hole on the periphery of the bottom surface thereof, which is on the opposite side of the direction in which the optical device is inserted into the through-hole (the wider bottom surface provided with the electrode 402 in FIG. 6). The optical device is held in the vicinity of the electrode 402 in such a manner as to be fixed, which can secure the contact with the internal wall and the stable housing in a designed position.

However, because the electrode 403 is provided in the narrower bottom surface and needs to be electrically coupled to the electrode wiring 102, the inclination should be adjusted so as to secure the electrical coupling. As one method, the electrode 403 is formed into a canopy-like shape to extend outwards.

4. The maximum diameter of the optical device 4 (D42 in FIG. 6) is larger than the minimum diameter D11 and smaller than the maximum diameter D12 of the through-hole 101a, and larger than the maximum diameter D22 of the optical device 2a inserted in advance. These magnitude relations allow the optical device 4 to contact the internal wall at any position inside of the through-hole, which is closer to the opening with the maximum diameter with respect to the optical device 2a, and to be housed stably.

As for a method for housing the optical device 4 in the through-hole 101a, a method described in U.S. Pat. No. 5,904,545 can be used similarly as in the optical device 2a.

According to the second embodiment, effects similar to those of the first embodiment can be brought about. In particular, because a plurality of optical devices can be housed, an integration degree of the optical devices can be increased. In addition, because a plurality of optical devices are housed in one through-hole, they are coaxial, which suppresses light loss in light transmission.

Third Embodiment

A third embodiment of the present invention relates to an optical communication module using a double-ended tapered through-hole (hour-glass shaped), which is opened bi-directionally.

Figure 7:
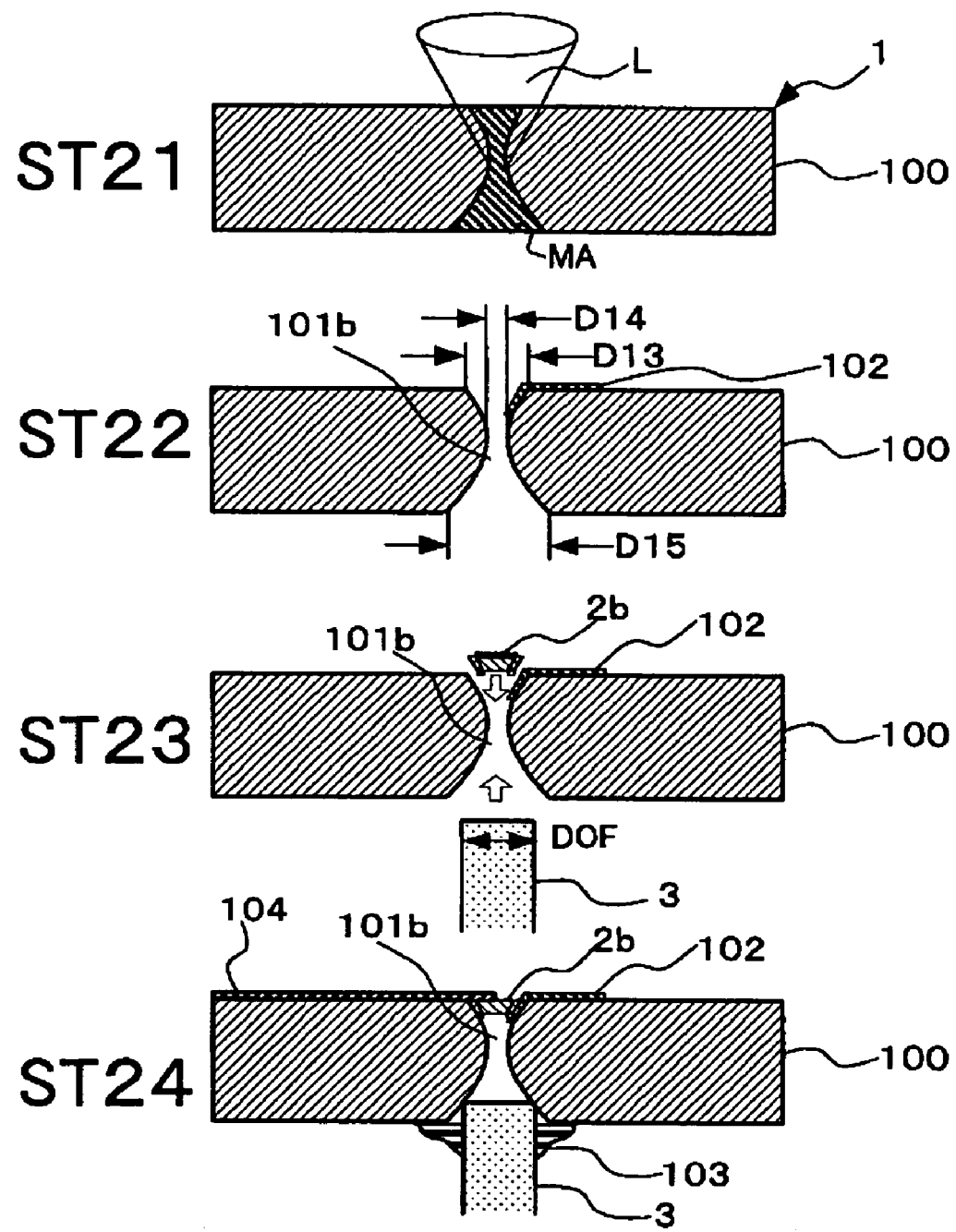
FIG. 7 shows cross-sectional views of the manufacturing steps illustrating a manufacturing method of an optical communication module according to a third embodiment of the present invention.

FIG. 7 shows cross-sectional views of the manufacturing steps illustrating a manufacturing method of an optical communication module according to the third embodiment of the present invention. Although FIG. 7 shows expanded cross-sectional views of one through-hole, a case where a plurality of through-holes is formed in one substrate can be considered similarly. The same members and shapes as those of the first embodiment are indicated by the same numerals and signs, and their description will be omitted.

Tapered Through-hole Forming Step: ST21

Firstly, a double-ended tapered through-hole 101b is provided in the substrate 100. The substrate 100 and the femto-second pulse laser are similar to those of the above-described first embodiment. However, irradiation conditions of the laser are changed and the double-ended tapered through-hole with a constriction portion in the middle thereof is formed. Changing the irradiation conditions of the laser, and using a diffraction grating in combination enable formation of a tapered through-hole having an arbitrary diameter. Because these conditions are experimentally obtained, the irradiation conditions are determined by conducting measurement in each case according to the substrate material. Process steps other than the laser irradiation conditions are similar to that of the first embodiment. By removing the property-changed region MA by the laser irradiation, the double-ended tapered through-hole 101b is formed (ST22).

The step of forming the electrode wiring 102 from one surface of the substrate 100 is similar to that of the first embodiment. The electrode wiring 104 to be coupled to the other electrode of the optical device is formed after an optical device is housed because the optical device should be inserted in advance (refer to ST24). ST22 shows a shape of the tapered through-hole formed in these steps. As shown in ST22, the double-ended tapered through-hole 101b is pierced and has a shape such that diameters D13 and D15 of openings with maximum diameters are larger than a diameter D14 of the constriction portion. The electrode wiring 102 is formed continuously from one opening to the constriction portion inside of the through-hole 101b. The electrode wiring 102 may cover the whole surface of the through-hole 101a instead of a part of the surface. According to the present embodiment, because the coupling with the other electrode of the optical device is made from the same surface that the electrode wiring 102 is provided, the electrode wiring 102 is patterned for preventing a short-circuit.

Optical Device Mounting Step: ST23

Next, an optical device 2b is housed inside of the tapered through-hole 101b formed in the above-described steps. As for the optical device 2b, a light-receiving element or a light-transmitting element may be selected based on whether the optical communication module is used for receiving or transmitting light.

Figure 8A:
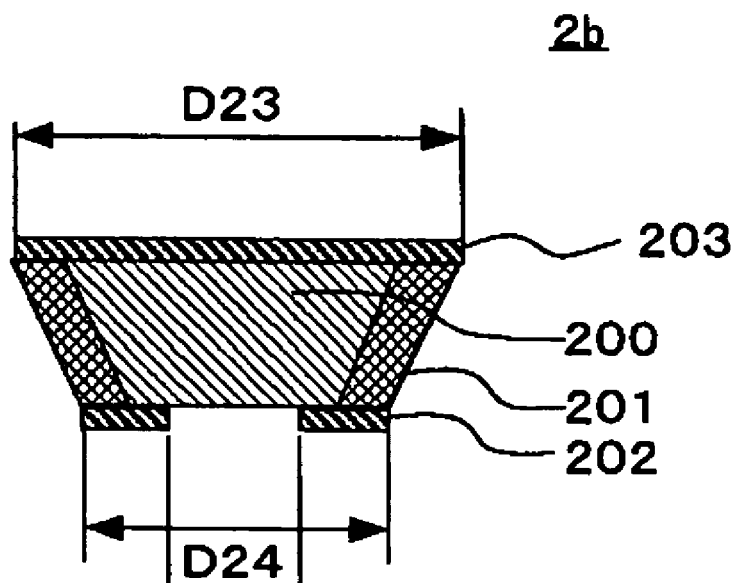
FIG. 8(a) is a cross-sectional view and FIG. 8(b) is a plan view.
Figure 8B:
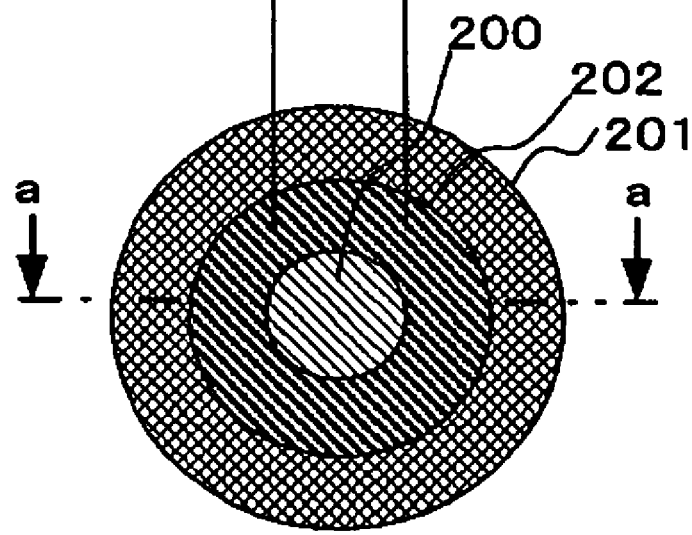

FIG. 8 shows a structure of the optical device 2b. FIG. 8(a) is a cross-sectional view, and FIG. 8(b) is a plan view. Being different from the first embodiment, because an expansion direction of the taper at a position where the optical device 2b is mounted is opposite, a shape of the optical device 2b is changed corresponding to it. As shown in FIG. 8, the optical device 2b according to the present embodiment is a surface emitting laser as in the first embodiment, in which a center of a light-emitting region coincides with a geometrical center. However, an area of a bottom surface, on which the electrode 202 is provided, is smaller, and an area of a surface, on which the electrode 203 is provided, is larger. Accordingly, the optical device 2b has a proper shape where the optical device is inserted from the opposite direction in the tapered hole opened in the opposite direction with respect to the first embodiment.

It is preferable that a shape of the optical device 2b and the tapered through-hole 101b have the following relations.

1. Shapes of cross sections perpendicular to axial directions are similar. By making the shapes similar, a contacting region becomes larger when the optical device is housed, which brings about more stable housing of the optical device. In this point, the present embodiment is similar to the first embodiment.

2. Inclination of an internal wall of the through-hole and a side surface of the optical device are approximately the same. By making the inclination approximately the same, a contacting area becomes larger when the optical device is housed, which brings about more stable housing of the optical device similarly to the above-described. In this point, the present embodiment is also similar to the first embodiment. However, according to the present embodiment, because the optical device is inserted in the double-ended tapered through-hole 101b from the side of the tapered hole opened in the opposite direction with respect to the first embodiment, a right conical shape with the top thereof cut is facing the opposite direction.

3. When the optical device is housed in the through-hole, the side surface inclination of the optical device is adjusted in such a manner that the optical device contacts the internal wall of the through-hole on the periphery of the bottom surface, which is the opposite side of the direction in which the optical device is inserted into the through-hole (In FIG. 8, the bottom surface (where the electrode 203 is present), which is the opposite side of the surface having a light-emitting region (where the electrode 202 is present)). In this point, the present embodiment is similar to the first embodiment.

4. The maximum diameter of the optical device (D23 in FIG. 8) is larger than the diameter D14 of the constriction portion of the through-hole 101a and smaller than the maximum diameter D13 on the insertion side. These magnitude, relations allow the optical device to contact the internal wall at any position inside of the through-hole and to be housed stably.

A method of housing the optical device 2b in the through-hole 101b can be considered similarly as in the first embodiment.

Optical Fiber Mounting Step: ST4

Next, the optical fiber 3 is inserted from the side of the other opening with the maximum diameter of the double-ended tapered through-hole 101b, which is opened in the opposite direction, and is housed inside of the through-hole. In this point, the present embodiment is similar to the first embodiment.

However, in the present embodiment, because the optical device 2b is not arranged in the same tapered shape through-hole for the optical fiber 3, the diameter DOF of the optical fiber 3 is larger than the diameter D14 of the constriction portion of the through-hole 101b and smaller than the maximum diameter D15 of the opening on the insertion side of the optical fiber.

The fixing step and the other electrode wiring step are similar to those of the first embodiment, and their description will be omitted (ST24).

According to the third embodiment, effects similar to those of the first embodiment are brought about. In particular, according to the present embodiment, because the optical device 2b is provided on the side different from the tapered shape through-hole, into which the optical fiber 3 is inserted, the manufacturing step becomes easy. For example, as for the electrode wiring 102, because the surface of the through-hole 101b is exposed (appears) on the top surface of the substrate, the electrode forming is relatively easy, which can simplify the manufacturing step and cut manufacturing costs.

Fourth Embodiment

According to a fourth embodiment, to the double-ended tapered through-hole of the above-described third embodiment, another optical device is further housed in the same through-hole before housing the optical fiber. FIG. 9 shows cross-sectional views of manufacturing steps illustrating a manufacturing method of an optical communication module according to the fourth embodiment.

The present embodiment is similar to the above-described third embodiment except for the mounting of another optical device 4. Accordingly, the forming step of the tapered through-hole 101b corresponds to ST21 and ST22 in FIG. 7, the mounting step of the optical device 2b (ST31) corresponds to ST23 in FIG. 7, the mounting step of the optical fiber 3 (ST32) corresponds to ST23 in FIG. 7, and the fixing step (ST33) corresponds to ST24 in FIG. 7. Therefore, the same members and shapes as those of the third or the first embodiment are indicated by the same numerals and signs and their description will be omitted.

According to the present embodiment, because the other optical device 4 mounted later makes a direct optical coupling with the optical fiber 3, the optical device 2b mounted in advance is, for example, a device whose light-emitting direction is opposite (for example, upward in FIG. 9).

Furthermore, because the electrode wiring 102 provided before housing the optical device 2b is shared by the two optical devices, it is extended up to a fixing position of the optical device 4, which is to be inserted later.

Furthermore, in addition to the electrode wiring 102, the electrode wiring 105 for electrically coupling to the other electrode of the optical device 4 is formed from the opposite surface side of the substrate 100 to the inside of the through-hole 101b.

According to the present embodiment, after housing the optical device 2b in one tapered shape through-hole, the optical device 4 is further housed in the other tapered shape through-hole. The optical device 4 can be considered to be similar to the above-described second embodiment. In addition, because a shape and a mounting method thereof are considered to be similar to those of the second embodiment, their description will be omitted.

According to the present invention, effects similar to those of the above-described embodiments can be brought about.

MODIFIED EMBODIMENT

The present invention is not limited to the above-described embodiments, and can be modified and applied within the scope of the spirits of the claims. For example, any number of optical devices and any number of optical fibers can be further integrated in one through-hole, as long as they can be housed.

Figure 10:
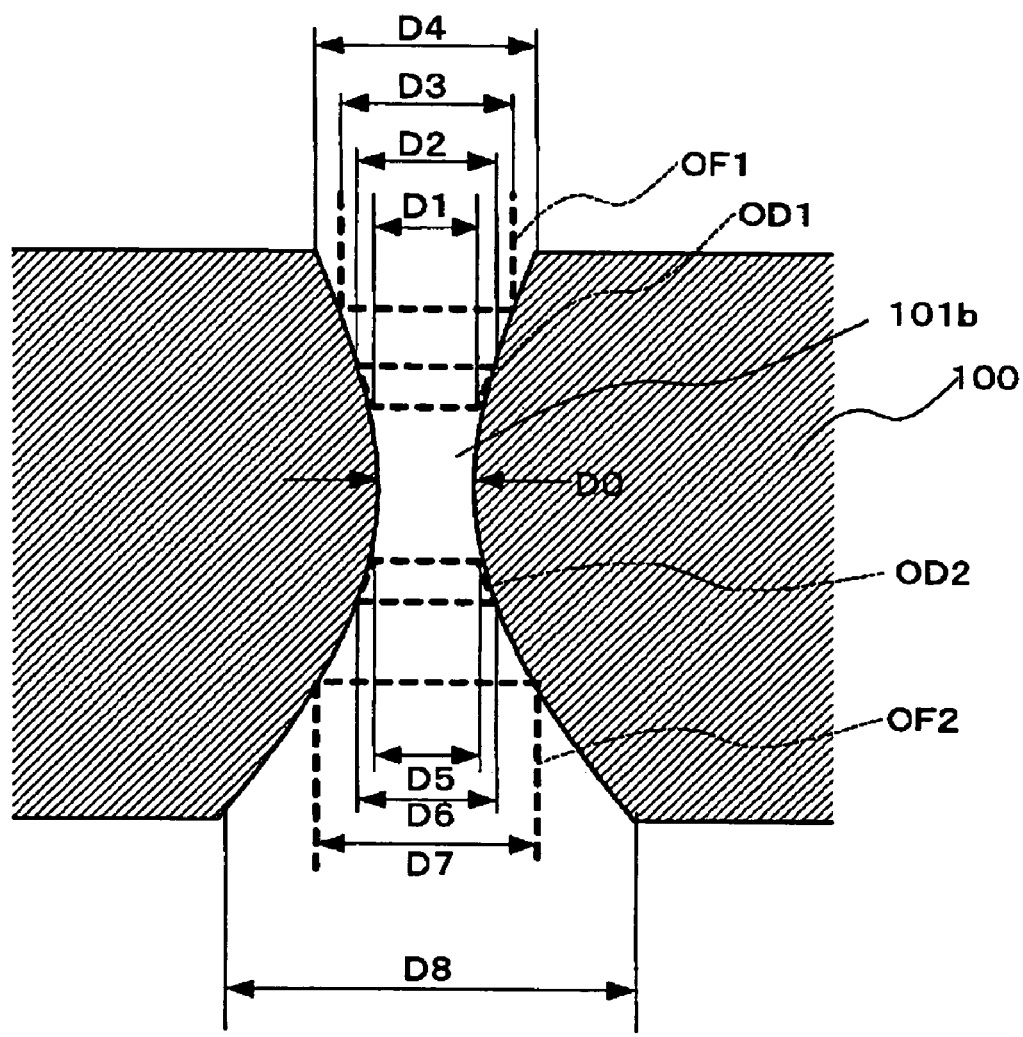
FIG. 10 shows a view illustrating a shape of a double-ended tapered through-hole of an optical communication module according to the present invention.

FIG. 10 shows an example, in which an optical coupling as in the first embodiment is made in each tapered shape of the double-ended tapered through-hole 101b. In the through-hole 101b, a constriction portion thereof has a minimum diameter D0, one opening has a maximum diameter D4, and the other opening has a maximum diameter D8. Narrower bottom surfaces of optical devices OD1 and OD2 have diameters D1 and D5, respectively, and wider bottom surfaces have diameters D2 and D6, respectively. End part diameters of optical fibers OF1 and OF2 have diameters D3 and D7, respectively. The through-hole, the optical devices, and the optical fibers have the following relations.

1. The maximum diameter D2 (D6) of the optical device OD1 (OD2) is larger than the minimum diameter D0 and smaller than maximum diameter D4 (D8) of the through-hole 101b.

2. The diameter D3 (D7) of the optical fiber OF1 (OF2) is smaller than the maximum diameter D4 (D8) of the through-hole 101b, and larger than the maximum diameter D2 (D6) of the optical device in the case where the optical device is inserted in advance.

3. Inclination of a side surface, which is formed according to a difference between the maximum diameter D2 (D6) and the minimum diameter D1 (D5) of the optical device OD1 (OD2), is approximate to (approximates) the inclination of a wall surface of the through-hole 101b. Preferably, an adjustment is made so that the optical device contacts the internal wall of the through-hole 101b more securely on the periphery of the bottom surface (the maximum diameter D2 (D6)), which is closer to the opening.

4. In the case where a plurality of optical devices are provided in one tapered shape, the maximum diameter of the optical device inserted later is larger than the maximum diameter of the optical device inserted in advance.

The above-described magnitude relations allow the optical device 4 to contact the internal wall at any position, which is closer to the opening with the maximum diameter of the through-hole with respect to the optical device 2a, and to be housed stably.

Fifth Embodiment

A fifth embodiment of the present invention relates to an electronic apparatus comprising the optical communication module manufactured by the manufacturing method of the optical communication module of the present invention, and particularly to a personal computer.

Figure 11:
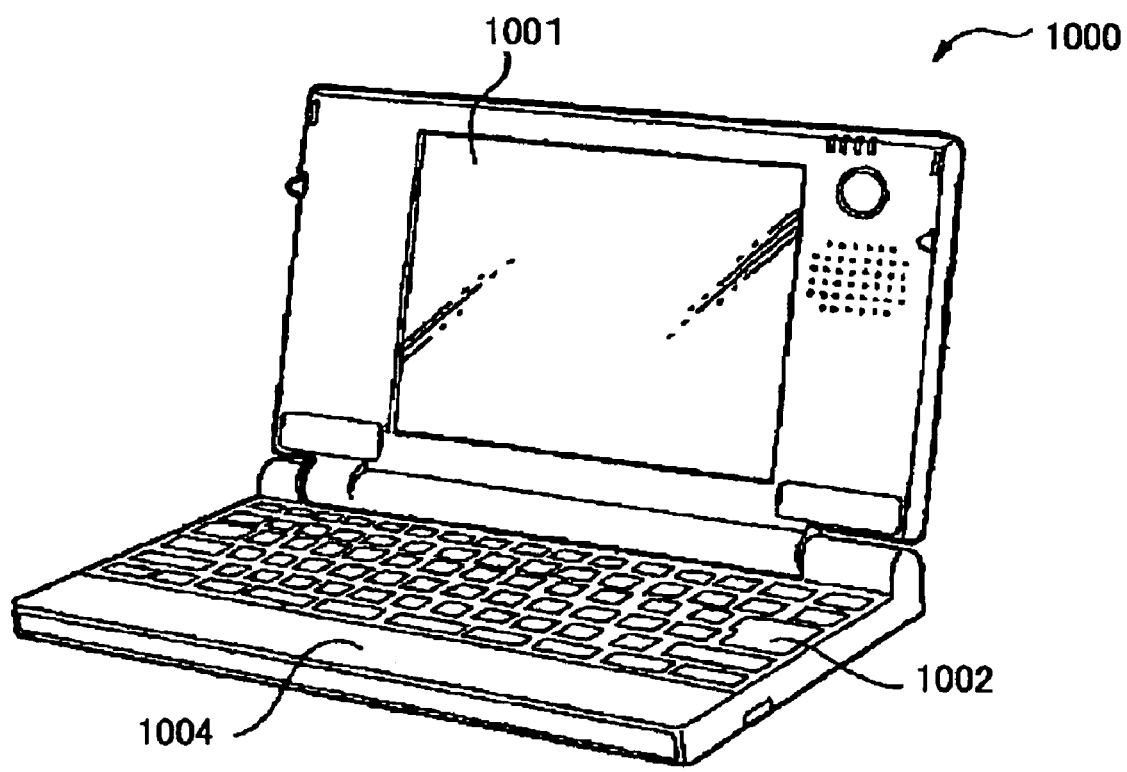
FIG. 11 shows a view of an example of an electronic apparatus according to a fifth embodiment of the present invention, illustrating a portable personal computer.

FIG. 11 is a perspective view showing a constitution of a personal computer 1000 according to the present embodiment. In FIG. 11, the personal computer 1000 is made of a display panel 1001 and a body 1004 including a keyboard 1002. The optical communication module manufactured by the manufacturing method of the optical communication module of the present invention is used for communication between built-in boards of the body 1004 of the computer display apparatus 1000 and between the body 1004 and the display panel 1001.

The optical communication module according to the present invention is not limited to the above-described example, but can be applied to any electronic apparatus using optical communication, which is high- speed communication.

What is claimed is:

1. A manufacturing method of an optical communication module that optically couples at least one optical device and an optical transmitter, comprising:

providing a tapered through-hole in a substrate, the tapered through-hole having a first end in a first side of the substrate and a second end in a second side of the substrate, the first end being smaller in diameter than the second end;

housing a first optical device within the tapered through-hole between the first and second ends, the first optical device having an optical transmission point substantially coincident with a geometrical center of the tapered through-hole; and inserting an optical transmitter having a larger diameter than a diameter of the optical device in the tapered through-hole housing the optical device, thereby aligning a core of the optical transmitter with the geometrical center of the tapered through-hole, wherein providing the tapered through-hole comprises:

irradiating the substrate with a femto-second pulse laser while relatively moving the femto-second pulse laser in an axial direction of the tapered through-hole; and removing a region of the substrate changed by the irradiation of the femto-second pulse laser so that the tapered through-hole emerges.

2. The manufacturing method of the optical communication module according to claim 1, comprising:

fixing at least one of a periphery of the first optical device and a periphery of the optical transmitter with resin after at least one of housing the first optical device and inserting the optical transmitter.

3. The manufacturing method of the optical communication module according to claim 1, wherein, in the step of housing the first optical device, the first optical device includes a side surface contacting an internal wall of the tapered through-hole at an inclination corresponding to a tapered shape of the internal wall of the tapered through-hole at a contacting position.

4. The manufacturing method of the optical communication module according to claim 3, wherein the first optical device contacts the internal wall of the tapered through-hole in a vicinity of a bottom surface of the substrate when housed in the tapered through-hole.

5. An electronic apparatus comprising the optical communication module manufactured by the manufacturing method of the optical communication module according to claim 1.

6. The manufacturing method of the optical communication module according to claim 1, further comprising:

housing a second optical device within the tapered through-hole between the first and second ends after housing the first optical device, the second optical device having a diameter larger than the diameter of the first optical device and smaller than the diameter of the optical transmitter.

7. The manufacturing method of the optical communication module according to claim 1, further comprising:

forming an electrode wiring for conduction with an electrode provided in a part of the first optical device before housing the first optical device.

8. The manufacturing method of the optical communication module according to claim 1, further comprising:

forming an electrode wiring for conduction with an electrode provided in the first optical device after housing the first optical device.

9. A manufacturing method of an optical communication module that optically couples an optical device and an optical transmitter, comprising:

providing a double-ended tapered through-hole having a constriction portion inside of a substrate, a first opening in a first side of the substrate, and a second opening in a second side of the substrate so as to be opened bi-directionally;

housing a first optical device within the double-ended tapered through-hole between the constriction portion and the first opening, the first optical device having an optical transmission point substantially coincident with a geometrical center of the double-ended tapered through-hole and having a smaller diameter than a diameter of the first opening of the double-ended tapered through-hole;

housing a second optical device within the double-ended tapered through-hole between the constriction portion and the second opening, the second optical device having a diameter smaller than the diameter of the second opening; and inserting an optical transmitter into the second opening of the double-ended tapered through-hole after housing the second optical device, the optical transmitter having a diameter larger than a diameter of the second optical device and smaller than a diameter of the second opening of the double-ended tapered through-hole, wherein providing the double-ended tapered through-hole comprises:

irradiating the substrate with a femto-second pulse laser while relatively moving the femto-second pulse laser in an axial direction of the double-ended tapered through-hole; and removing a region of the substrate chanced by the irradiation of the femto-second pulse laser so that the double-ended tapered through-hole emerges.

* * * * *